(12) United States Patent
Tanaka (10) Patent No.: US 9,604,504 B2
(45) Date of Patent: Mar. 28, 2017

(54) PNEUMATIC TIRE

(71) Applicant: SUMITOMO RUBBER INDUSTRIES, LTD., Kobe-shi, Hyogo (JP)

(72) Inventor: Susumu Tanaka, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 547 days.

(21) Appl. No.: 14/049,500

(22) Filed: Oct. 9, 2013

(65) Prior Publication Data

US 2014/0166169 A1 Jun. 19, 2014

(30) Foreign Application Priority Data

Dec. 19, 2012 (JP) ................................. 2012-277261

(51) Int. Cl.
*B60C 11/03* (2006.01)
*B60C 11/00* (2006.01)
*B60C 11/13* (2006.01)

(52) U.S. Cl.
CPC ...... *B60C 11/0083* (2013.04); *B60C 11/0304* (2013.04); *B60C 11/0309* (2013.04); *B60C 11/1376* (2013.04); *B60C 2011/0353* (2013.04); *B60C 2011/0355* (2013.04)

(58) Field of Classification Search
CPC ............. B60C 11/0083; B60C 11/1376; B60C 11/1392
See application file for complete search history.

(56) References Cited

U.S. PATENT DOCUMENTS

| 4,722,378 A | * | 2/1988 | Carolla | ............... B60C 11/0302 |
| | | | | 152/209.15 |
| 8,925,598 B2 | * | 1/2015 | Ebiko | ................. B60C 11/0083 |
| | | | | 152/209.14 |
| 2010/0319825 A1 | * | 12/2010 | Yoshinaka | ......... B29D 30/3028 |
| | | | | 152/209.5 |

FOREIGN PATENT DOCUMENTS

| EP | 2067636 | * | 6/2009 |
| JP | 2000-142030 A | | 5/2000 |
| JP | 2002-029216 | * | 1/2002 |

(Continued)

OTHER PUBLICATIONS

English machine translation of EP2067636, dated Jun. 2009.*

(Continued)

*Primary Examiner* — Steven D Maki
*Assistant Examiner* — Robert Dye
(74) *Attorney, Agent, or Firm* — Birch, Stewart, Kolasch & Birch, LLP (57) ABSTRACT

A pneumatic tire has an inboard tire tread edge and an outboard tire tread edge positioned towards the center of a vehicle body and away from the center of the vehicle body, respectively. The tire tread is divided by circumferentially continuously extending main grooves into a center land portion, a pair of middle land portions and a pair of shoulder land portions. In a meridian section of the tire, a center profile of a tread of the center land portion and a middle profile of a tread of each of the middle land portions protrude convexly, radially outwardly from a virtual tread profile defined as smoothly passing through the axial ends of the treads of the center land portion and the middle land portions. The peak of the center profile and the peak of the middle profile are off-centered toward the outboard tire tread edge.

4 Claims, 6 Drawing Sheets

(56) References Cited

FOREIGN PATENT DOCUMENTS

| JP | 2005-263180 | * | 9/2005 |
|----|-------------|---|--------|
| JP | 2005-319890 A | | 11/2005 |

OTHER PUBLICATIONS

English machine translation of JP2002-029216, dated Jan. 2002.*
"Nissan 240SX—Performanc Suspension Tuning," Web page <http://www.240edge.com/performance/tuning-camber.html>, Jan. 10, 2007, retrieved from Internet Archive Wayback Machine <https://web.archive.org/web/20070110014035/http://www.240edge.com/performance/tuning-camber.html> on Jun. 7, 2016).*
Extended European Search Report, dated May 8, 2014, for European Application No. 13198097.1.

* cited by examiner

PNEUMATIC TIRE

BACKGROUND OF THE INVENTION

The present invention relates to a pneumatic tire, more particularly to a tread profile for a pneumatic tire installed on a vehicle with negative camber capable of improving the aquaplane resistance and uneven wear resistance of the tire.

Heretofore, in order to improve the steering stability and uneven wear resistance of a pneumatic tire, the tread of the tire is provided with a profile such that, in the meridian section of the tire, the radius of curvature is gradually decreased from the tire equator toward the tread edges. Accordingly, the radii of curvature of the treads of land portions (ground contacting portions or elements) formed in the tread of the tire are gradually decreased from the tire equator toward the axial outside.

In such tire, however, the ground pressure of each land portion becomes small in its axial central region when compared with the axial edge regions. As a result, water existing between the axial central region of the land portion and the road surface can not be readily removed.

Japanese Patent Application Publication No. 2005-319890 discloses a pneumatic tire in which the profile of the tread of a center land portion disposed on the tire equator protrudes convexly, radially outwardly from a virtual profile defined by smoothly connecting axial ends of land portions excepting the center land portion (virtual profile corresponding to the above-mentioned conventional profile), and the maximally protruding point is positioned at the axial center of the land portion. In this case, the ground pressure of the center land portion becomes increased in its axial central region, therefore, it is possible to even the ground pressure of the center land portion in the axial direction.

In recent years, on the other hand, there is a trend such that, in order to improve the high speed stability, a pneumatic tire is installed on a passenger car with negative camber.

Figure 6:
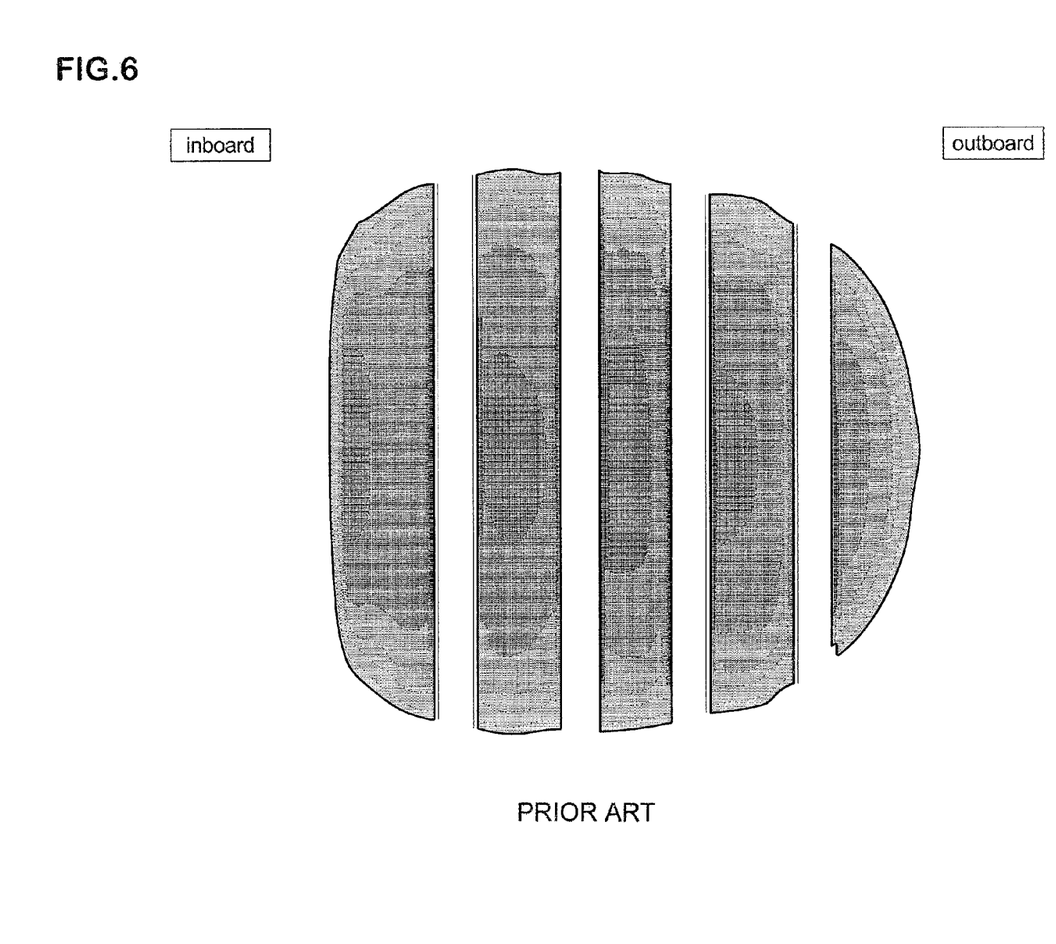
FIG. 6 shows a distribution of the ground pressure of the ground contacting patch of the prior art tire.

FIG. 6 shows a ground contact pressure distribution of a pneumatic tire having five straight ribs, to which the tread profile of the above-mentioned prior art is applied, is installed with negative camber. In the figure, the darker the halftone, the higher the ground pressure.

As shown in FIG. 6, even in the above-mentioned pneumatic tire, the ground pressure of each land portion becomes higher in the inboard side than in the outboard side, and therefore, the drainage and the uneven wear resistance cannot be improved.

SUMMARY OF THE INVENTION

It is therefore, an object of the present invention to provide a pneumatic tire, in which the ground pressure of each land portion becomes even in the tire axial direction when the tire is installed on a vehicle with negative camber, and both the drainage, especially the aquaplane resistance, and the uneven wear resistance are effectively improved.

According to the present invention, a pneumatic tire compresses a tread portion, a pair of bead portions and a pair of sidewall portions extending therebetween, the tread portion having an inboard tire tread edge and an outboard tire tread edge intended to be positioned towards the center of a vehicle body and away from the center of the vehicle body, respectively, and the tread portion divided by circumferentially continuously extending main grooves into a center land portion, a pair of middle land portions and a pair of shoulder land portions, wherein in a meridian section of the normally-inflated unloaded tire, a center profile which is the profile of a tread of the center land portion and a middle profile which is the profile of a tread of each of the middle land portions protrude convexly, radially outwardly from a virtual tread profile, wherein the virtual tread profile is defined as smoothly passing through both axial ends of the tread of the center land portion and both axial ends of the tread of each of the middle land portions, a peak of the center profile which is the most protruding point farthest from the virtual tread profile is positioned on the outboard tire tread edge side of the axial center of the center land portion, and a peak of the middle profile which is the most protruding point farthest from the virtual tread profile is positioned on the outboard tire tread edge side of the axial center of the middle land portion concerned.

Preferably, the axial distance La between the peak of the center profile and the axial center of the center land portion is in a range of from 0.10 to 0.30 times the axial width of the center land portion, and the axial distance Lb between the peak of the middle profile and the axial center of the middle land portion is in a range of from 0.10 to 0.30 times the axial width of the middle land portion.

Preferably, the protruding height of the peak of the center profile from the virtual tread profile is more than the protruding height of the peak of the middle profile from the virtual tread profile, and each protruding height is in a range of from 0.1 to 1.5 mm.

since the center profile and middle profile protrude radially outwardly from the virtual tread profile, the ground pressure of each of the center land portion and the middle land portions becomes even in the tire axial direction, and the drainage and uneven wear resistance can be improved. As the peak of each of the center profile and middle profiles is shifted from the axial center toward the outboard tire tread edge, when the tire is installed on a vehicle with negative camber, the ground pressure of each of the center land portion and the middle land portions becomes even in the tire axial direction. Therefore, the pneumatic tire according to the present invention can be improved in the drainage and uneven wear resistance.

The above-mentioned inboard tire tread edge and outboard tire tread edge are the axial outermost edges of the ground contacting patch of the tire (camber angle=0) in the normally inflated loaded condition.

The tread width is the axial distance between the inboard tire tread edge and outboard tire tread edge measured in the normally inflated unloaded condition of the tire.

The normally inflated unloaded condition is such that the tire is mounted on a standard wheel rim and inflated to a standard pressure but loaded with no tire load.

The normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/ Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard tire load is uniformly defined by 88% of the maximum tire load.

In this application including specification and claims, various dimensions, positions and the like of the tire refer to those under the normally inflated unloaded condition of the tire unless otherwise noted.

The terms "outboard" and "inboard" are used toward the outboard tread edge and inboard tread edge, respectively, to refer relative positions in the tire axial direction.

The terms "axially inner", "axially inward" and the like are used toward the tire equator, and the terms "axially outer", "axially outward" and the like are used toward the tire tread edge in order to refer relative positions in the tire axial direction.

The terms "width" of a groove means a dimension measured at the top of the groove perpendicularly to the widthwise center line of the groove unless otherwise noted.

DESCRIPTION OF THE PREFERRED EMBODIMENTS

Embodiments of the present invention will now be described in detail in conjunction with the accompanying drawings.

According to the present invention, the installation direction of the pneumatic tire is specified. In other words, it is specified which sidewall portion or tread edge has to be positioned away from the center of the vehicle body for example by making an indication such as "outside" in the sidewall portion.

The present invention is suitably applied to a passenger car tire.

Figure 1:
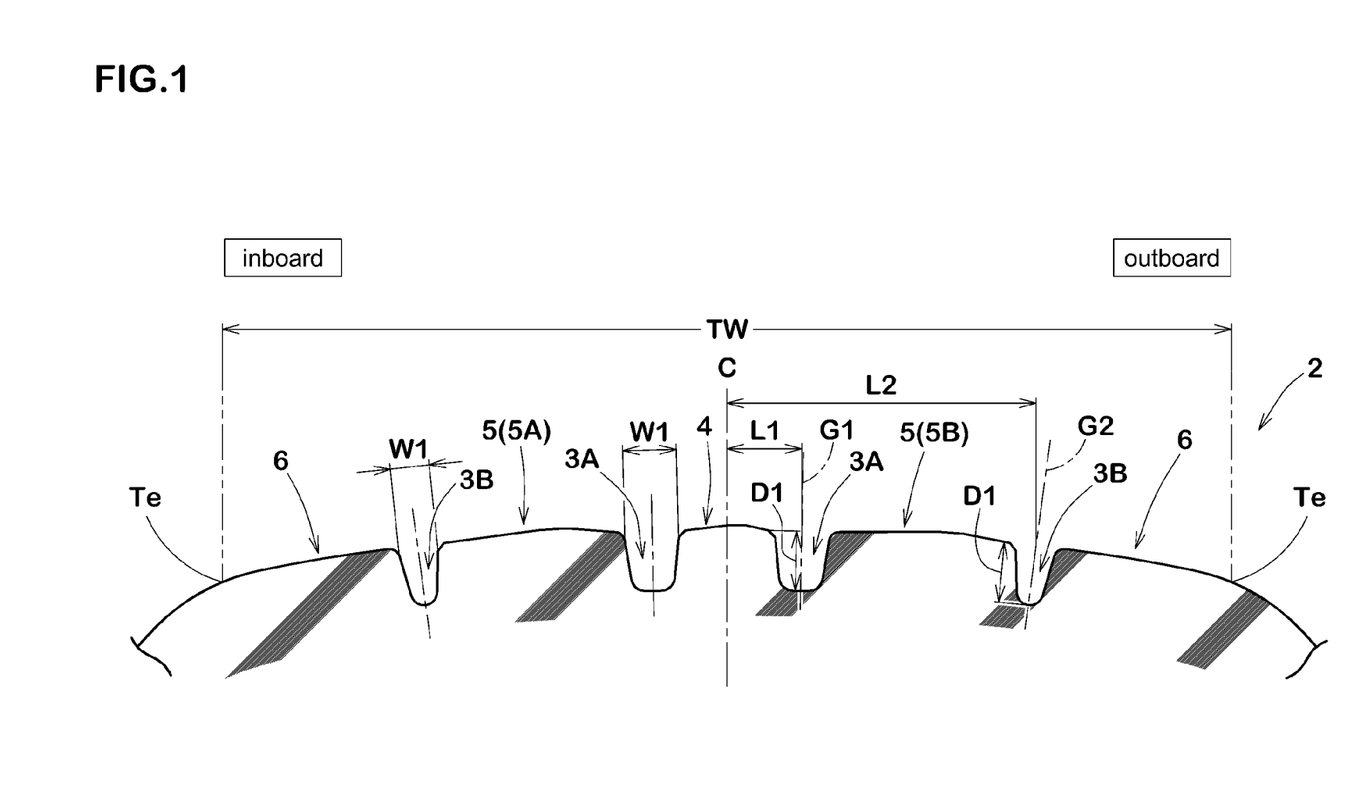
FIG. 1 is a meridian cross sectional view of the tread portion of a pneumatic tire as an embodiment of the present invention.

FIG. 1 shows the tread portion 2 of a pneumatic tire as an embodiment of the present invention under the normally inflated unloaded condition.

The tread portion 2 is provided with circumferentially continuously extending main grooves which include an axially inner crown main groove 3A and an axially outer shoulder main groove 3B which are disposed on each side of the tire equator C. Therefore, the tread portion 2 is divided into a center land portion 4 between the crown main grooves 3A,
a pair of middle land portions 5 between the crown main grooves 3A and the shoulder main grooves 3B, and
a pair of shoulder land portions 6 between the shoulder main grooves 3B and the tire tread edges Te.

Each of the land portions 4, 5 and 6 may be configured as a row of blocks separated by axial grooves (not shown) or a completely or substantially continuous rib which may be provided with grooves not extending across the either width of the land portion and/or very narrow width grooves such as sips and cuts.

Thus, the tread pattern is not limited to a rib pattern. A block pattern, rib-block pattern and the like can be employed. Further, the tread pattern is not limited to a line-symmetrical pattern. A point-symmetrical pattern, asymmetrical pattern and the like can be employed. Furthermore, a unidirectional pattern or a bidirectional pattern can be employed if desired.

In this embodiment, each of the main grooves 3A and 3B is a straight groove parallel with the tire circumferential direction in order to expedite the drainage and to maintain the circumferential rigidity of each land portion 4-6 to thereby improve the uneven wear resistance.

Aside from such straight groove, nonlinear grooves such as wavy groove and zigzag groove may be used as necessary.

The main grooves 3A and 3B can be disposed at symmetrical positions with respect to the tire equator C.

In order to achieve the drainage and the rigidity of each land portion 4-6 in a well balanced manner, the main grooves 3A and 3B preferably have a width W1 in a range of not less than 2%, more preferably not less than 3%, but not more than 8%, more preferably not more than 7% of the tire tread width TW, and the main grooves 3A and 3B preferably have a depth D1 in a range of not less than 5.0 mm, more preferably not less than 6.0 mm, but not more than 12.5 mm, more preferably not more than 10.0 mm.

The axial distance L1 of the groove center line G1 of the center main groove 3A from the tire equator C is preferably set in a range of from 4% to 12% of the tire tread width TW, and the axial distance L2 of the groove center line G2 of the shoulder main groove 3B from the tire equator C is preferably set in a range of from 25% to 35% of the tire tread width TW in order to secure the axial rigidity of each land portion 4-6.

The middle land portions 5 are an inboard middle land portion 5A and an outboard middle land portion 5B.

Figure 2:
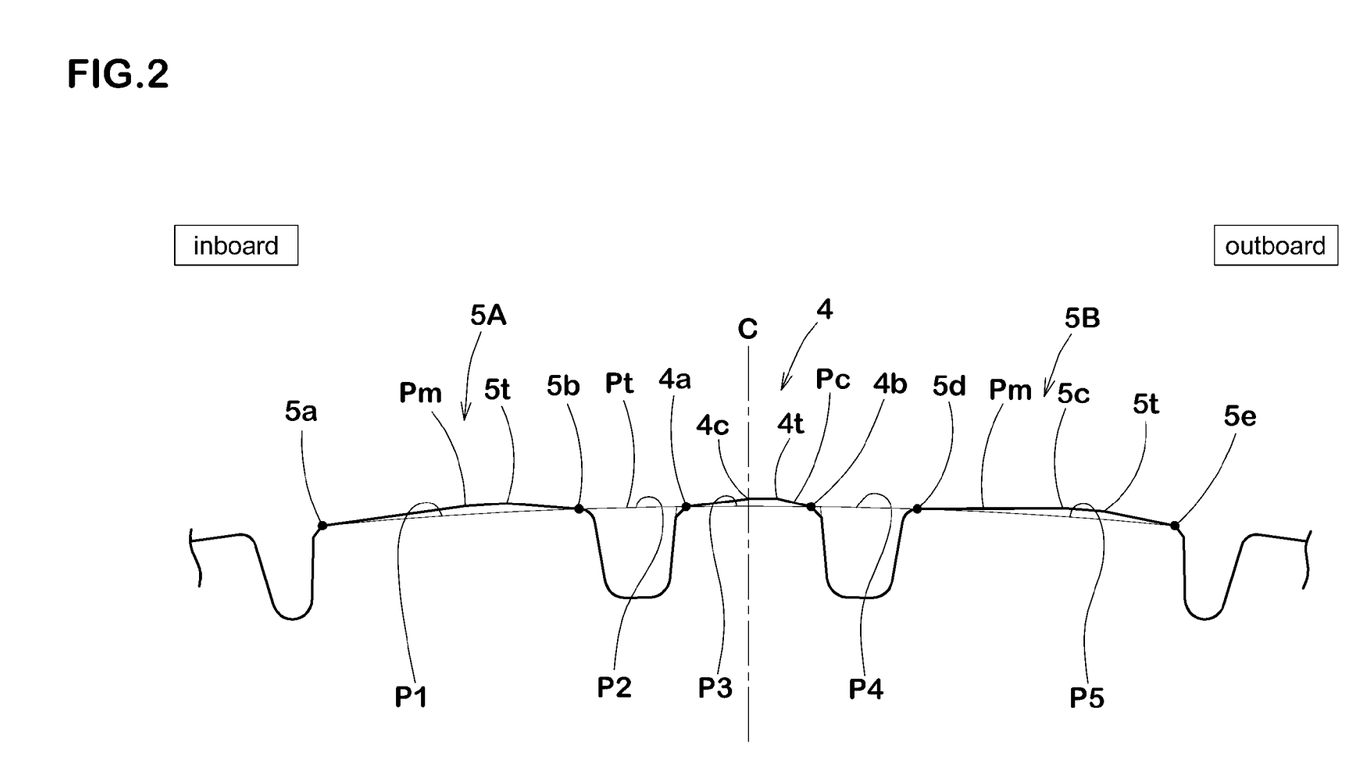
FIG. 2 shows the profile of the tread of the pneumatic tire.

AS shown in FIG. 2, there is defined a smooth virtual tread profile Pt passing through
both axial ends 4a and 4b of the tread of the center land portion 4,
both axial ends 5a and 5b of the tread of the inboard middle land portion 5A, and
both axial ends 5d and 5e of the tread of the outboard middle land portion 5B.

Based on circular arcs each passing through three of the above-mentioned ends 4a-5e of the land portions 4, 5A and 5B which three ends are axially adjacent, the virtual tread profile Pt is defined. Specifically, the circular arcs are
a first circular arc 7 passing through three ends 5a, 5b and 4a,
a second circular arc 8 passing through three ends 5b, 4a and 4b,
a third circular arc passing through three ends 4a, 4b and 5d and
a fourth circular arc passing through three ends 4b, 5d and 5e as shown in FIG. 2.

Figure 3:
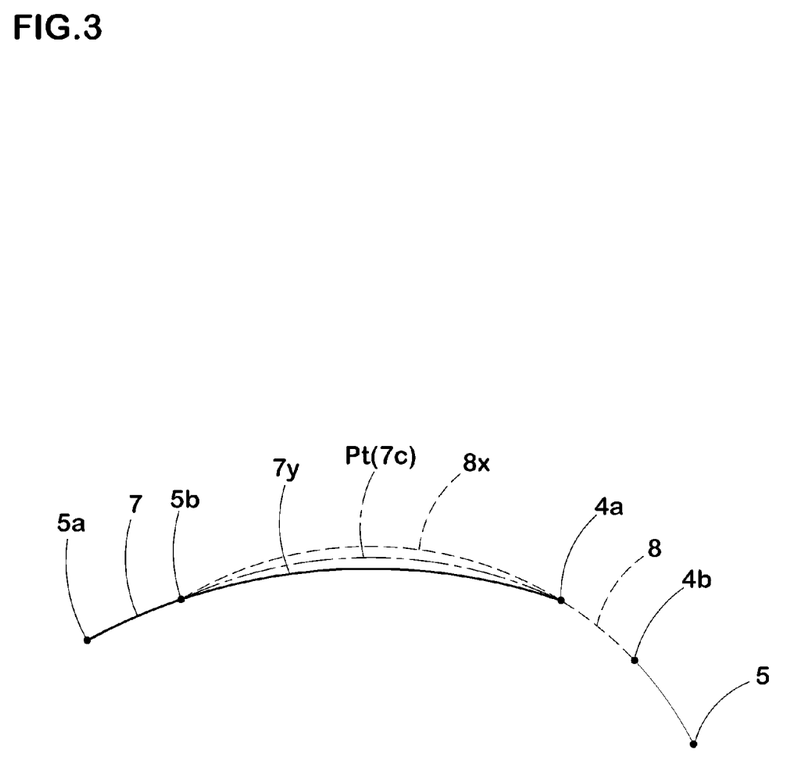
FIG. 3 is a diagram for explaining how to define the virtual tread profile.

The virtual tread profile Pt is defined as follows: a part P1 of the virtual tread profile Pt between the ends 5a and 5b is defined by the first circular arc;

a part P2 of the virtual tread profile Pt between the ends 5b and 4a is defined by the center line 7c between the first and second circular arcs 7 and 8 both passing through the two ends concerned (see FIG. 3);

a part P3 of the virtual tread profile Pt between the ends 4a and 4b is defined by the center line between the second and third circular arcs both passing through the two ends concerned; a part P4 of the virtual tread profile Pt between the ends 4b and 5d is defined by the center line between the third and fourth circular arcs both passing through the two ends concerned; and a part P5 of the virtual tread profile Pt between the ends 5d and 5e is defined by the fourth circular arc.

As shown in FIG. 2, a center profile Pc and a middle profile Pm protrude convexly, radially outwardly from the virtual tread profile Pt.

Here, the center profile Pc is the profile of the tread of the center land portion 4. The middle profile Pm is the profile of the tread of each middle land portion 5.

Thereby, the ground pressure of each of the center land portion 4 and the middle land portions 5 is increased in its axial central region, and the ground pressure is evened in the axial direction. As a result, the drainage and uneven wear resistance can be improved.

The peak 4t of the center profile Pc which is the most protruding point farthest from the virtual tread profile Pt is positioned on the outboard tire tread edge side of the axial center 4c of the center land portion 4.

The peak 5t of the middle profile Pm which is the most protruding point farthest from the virtual tread profile Pt is positioned on the outboard tire tread edge side of the axial center 5c of the middle land portion 5.

Accordingly, the ground pressure of each of the center land portion 4 and the middle land portions 5 is increased in an outboard tire tread edge side.

Therefore, when the tire is installed on a vehicle with negative camber which relatively increases the ground pressure in an inboard tire tread edge side, the ground pressure becomes uniform in the axial direction. AS a result, the drainage and uneven wear resistance can be improved.

Figure 4:
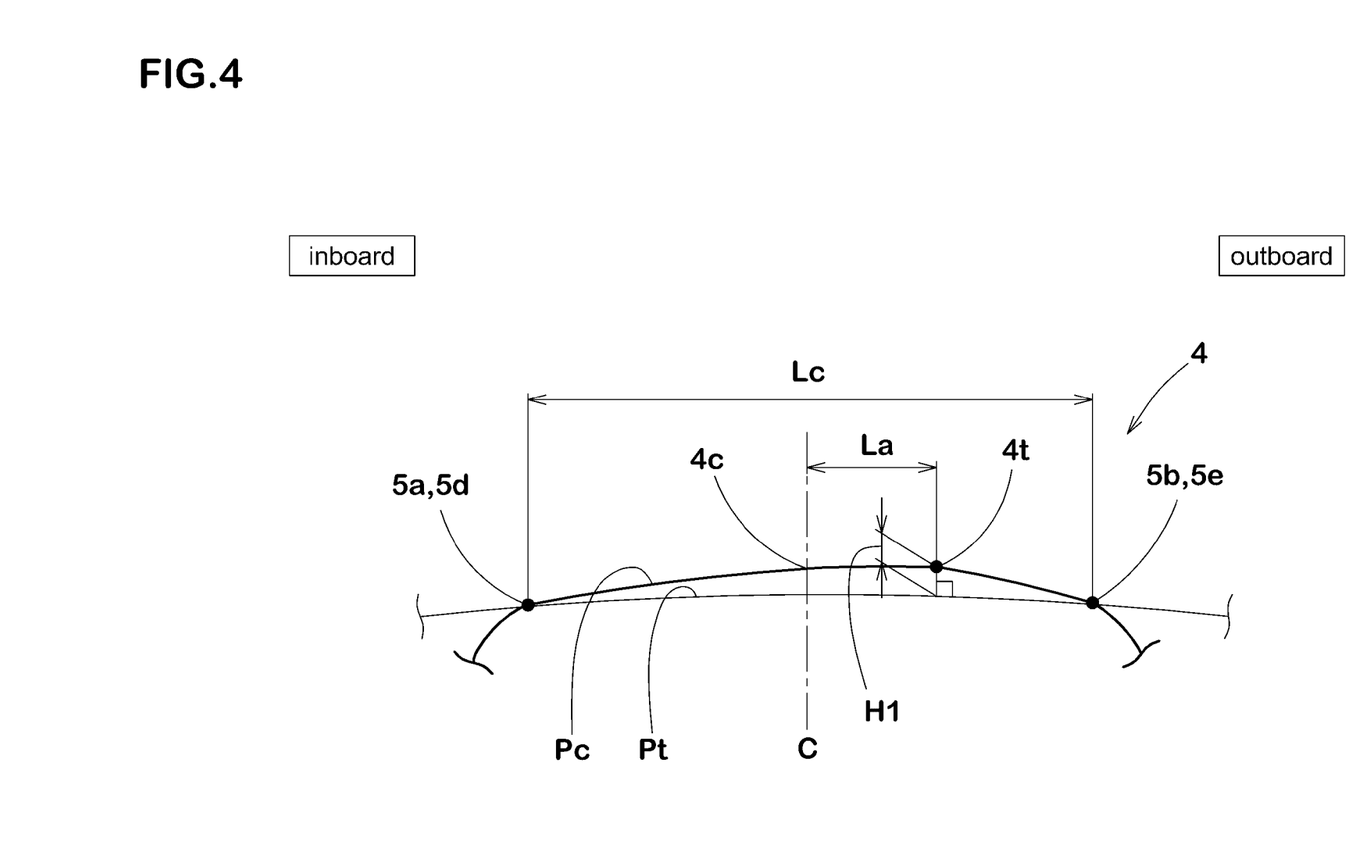
FIG. 4 shows the profile of the center land portion of FIG. 2.

As shown in FIG. 4, the axial distance La between the peak 4t of the center profile Pc and the axial center 4c of the center land portion 4 is preferably set in a range of not less than 0.1 times, more preferably not less than 0.15 times, but not more than 0.3 times, more preferably not more than 0.25 times the axial width Lc of the center land portion 4. If less than 0.10 times, it becomes difficult to reduce the ground pressure of the center land portion 4 on the inboard tire tread edge side. If more than 0.30 times, there is a possibility that the ground pressure of the center land portion 4 becomes high on the outboard tire tread edge side. In either case, it becomes difficult to improve the uneven wear resistance and the drainage.

Figure 5:
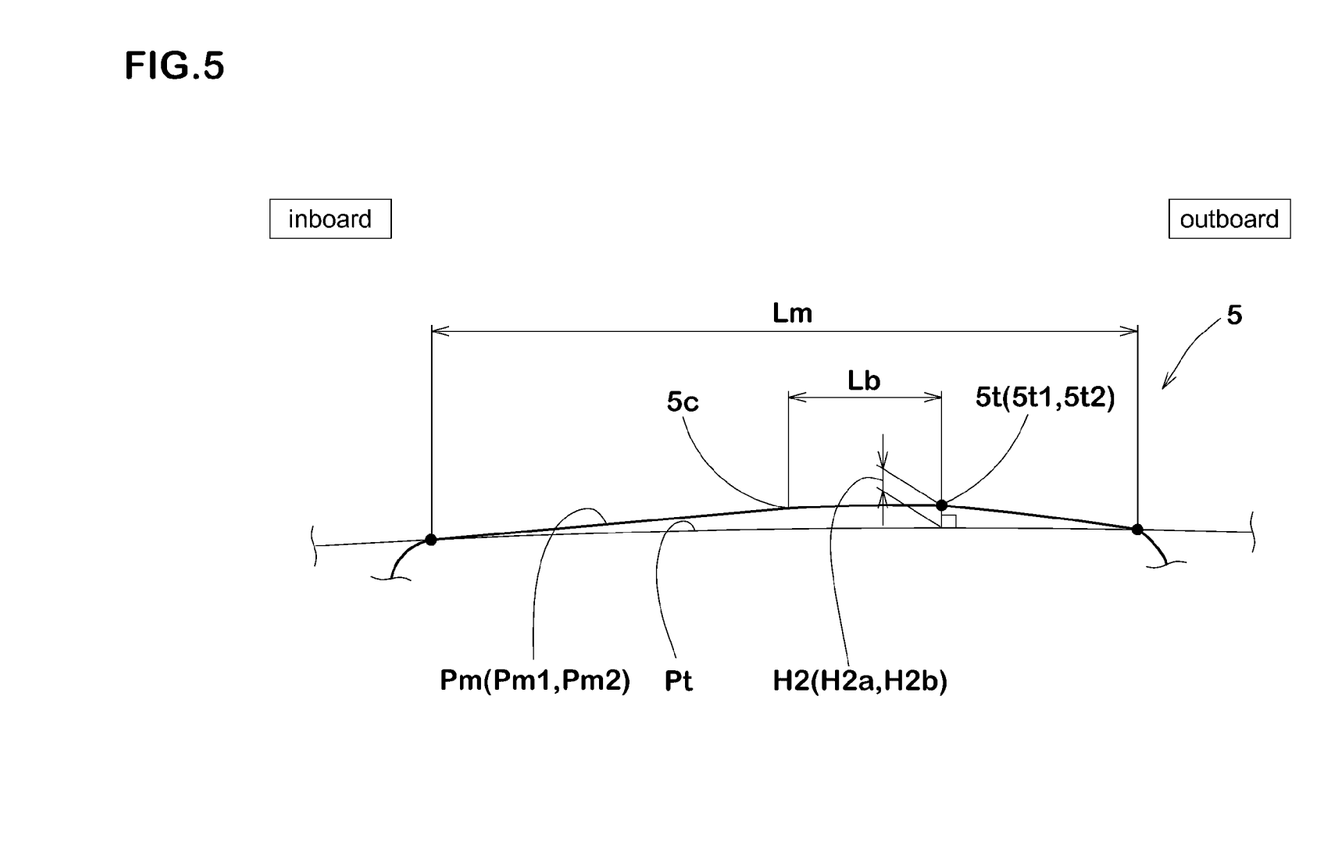
FIG. 5 shows the profile of the middle land portion of FIG. 2.

For similar reasons, as shown in FIG. 5, the axial distance Lb between the peak 5t of the middle profile Pm and the axial center 5c of the middle land portion 5 is preferably set in a range of not less than 0.10 times, more preferably not less than 0.15 times, but not more than 0.30 times, more preferably not more than 0.25 times the axial width Lm of the middle land portion 5.

As shown in FIG.4, the center peak height H1 which is the protruding height of the peak 4t of the center profile Pc from the virtual tread profile Pt is preferably set in a range of not less than 0.1 mm, more preferably not less than 0.2 mm, but not more than 1.5 mm, more preferably not more than 1.0 mm. If the center peak height H1 is less than 0.1 mm, the ground pressure cannot be increased near the peak 4t. If the center peak height H1 is more than 1.5 mm, the ground pressure is excessively increased near the peak 4t, and the ground pressure of the center land portion 4 cannot be evened in the axial direction.

For similar reasons, as shown in FIG. 5, the middle peak height H2 which is the protruding height of the peak 5t of the middle profile Pm from the virtual tread profile Pt is preferably set in a range of not less than 0.1 mm, more preferably not less than 0.2 mm, but not more than 1.5 mm, more preferably not more than 1.0 mm.

The center peak height H1 is preferably more than the middle peak height H2.

During cornering, the ground pressure of the middle land portions 5 becomes larger than that of the center land portion 4. Therefore, by making the center peak height H1 larger than the middle peak height H2, the ground pressure during cornering becomes more even between the center land portion 4 and the middle land portion 5. However, if the center peak height H1 becomes excessively larger than the middle peak height H2, then, during straight running, the ground pressure of the center land portion 4 becomes excessively increased in its axial central region.

Therefore, the difference (H1-H2) between the center peak height H1 and the middle peak height H2 is preferably set in a range of not less than 0.05 mm, but not more than 0.3 mm.

As shown in FIG. 5, the middle peak height H2a which is the protruding height of the peak 5t1 of the profile Pm1 of the inboard middle land portion 5A from the virtual tread profile Pt is preferably less than the middle peak height H2b which is the protruding height of the peak 5t2 of the profile Pm2 of the outboard middle land portion 5B from the virtual tread profile Pt.

With the negative camber, the ground pressure of the outboard middle land portion 5B becomes smaller than the ground pressure of the inboard middle land portion 5A. Therefore, by making the middle peak height H2a of the inboard middle land portion 5A smaller than the middle peak height H2b of the outboard middle land portion 5B, the ground pressure becomes more even between the inboard middle land portion 5A and the outboard middle land portion 5B.

If the middle peak height H2a of the inboard middle land portion 5A becomes excessively smaller than the middle peak height H2b of the outboard middle land portion 5B, then the ground pressure of the outboard middle land portion 5B becomes excessively larger than that of the inboard middle land portion 5A.

Therefore, the difference (H2b-H2a) between the middle peak height H2a of the inboard middle land portion 5A and the middle peak height H2b of the outboard middle land portion 5B is preferably not less than 0.05 mm, but not more than 0.3 mm.

In the above described embodiment shown in FIG. 1, the shoulder land portions 6 are not provided with a peak. But, it is also possible to configure the shoulder land portions 6 to have a similar profile to those of the center land portion 4 and middle land portions 5A and 5B.

Specifically, a shoulder profile which is the profile of a tread of each of the shoulder land portions 6 protrudes convexly, radially outwardly from a virtual tread profile passing through the ends 4a and 4b of the tread of the center land portion 4, the ends 5a and 5b of the tread of the inboard middle land portion 5A, the ends 5d and 5e of the tread of the outboard middle land portion 5B, and both axial ends (one of them is Te) of the tread of each of the shoulder land portions 6.

And, a peak of the shoulder profile which is the most protruding point farthest from the virtual tread profile is positioned on the outboard tire tread edge side of the axial center of the shoulder land portion 6. Therefore, the ground pressure of the shoulder land portion 6 becomes even in the axial direction.

Comparison Tests

Based on the profile shown in FIG. 1, pneumatic tires of size 225/55R17 (rim size: 17×717, tread width TW=180 mm) were prepared and tested for the drainage and uneven wear resistance. Specifications of the profile are show in Table 1.

<Drainage (Aquaplane Resistance) Test>

The test tires were mounted on all wheels of a 3500 cc rear-wheel-drive car. (camber angle: −1.5 degrees, tire pressure: 230 kPa)

The test car was run along a 100 meter radius circle on an asphalt road partially provided with a 10 mm depth 20 m long water pool, and the lateral acceleration (lateral G) during running in the water pool was measured at the front wheels, gradually increasing the speed entering into the water pool, to obtain the average for the speed range of from 50 to 80 km/h. The results are indicated in table 1 by an index based on comparative example tire Ref.1 being 100, wherein the larger is better.

<Uneven Wear Resistance Test>

The test car was run for 8000 km on a dry asphalt road. Then, the wear amount was measured at the axial ends of the center land portion at eight circumferentially different measuring positions.

The averaged wear amount is indicated in Table 1 by an index based on comparative example tire Ref.1 being 100, wherein the larger is better.

From the test results, it was confirmed that, according to the present invention, the drainage and the uneven wear resistance can be effectively improved.

TABLE 1

| Tire | Ref. 1 | Ref. 2 | Ref. 3 | Ex. 1 | Ex. 2 | Ex. 3 |
|---|---|---|---|---|---|---|
| center peak height H1 (mm) | 0 | 0.1 | 0.6 | 0.6 | 0.6 | 0.6 |
| middle peak height H2a (mm) *1 | 0 | 0.1 | 0.6 | 0.6 | 0.6 | 0.6 |
| distance La/center land portion width Lc | — | 0 | 0 | 0.08 | 0.10 | 0.20 |
| distance Lb/middle land portion width Lm | — | 0 | 0 | 0.08 | 0.10 | 0.20 |
| middle peak height difference H2b − H2a (mm) | — | 0 | 0 | 0 | 0 | 0 |
| drainage | 100 | 105 | 110 | 110 | 115 | 120 |
| uneven wear resistance | 100 | 100 | 100 | 105 | 110 | 115 |

| Tire | Ex. 4 | Ex. 5 | Ex. 6 | Ex. 7 | Ex. 8 | Ex. 9 |
|---|---|---|---|---|---|---|
| center peak height H1 (mm) | 0.6 | 0.6 | 0.05 | 0.1 | 1.5 | 1.8 |
| middle peak height H2a (mm) *1 | 0.6 | 0.6 | 0.05 | 0.1 | 1.5 | 1.8 |
| distance La/center land portion width Lc | 0.30 | 0.35 | 0.20 | 0.20 | 0.20 | 0.20 |
| distance Lb/middle land portion width Lm | 0.30 | 0.35 | 0.20 | 0.20 | 0.20 | 0.20 |
| middle peak height difference H2b − H2a (mm) | 0 | 0 | 0 | 0 | 0 | 0 |
| drainage | 115 | 110 | 110 | 110 | 130 | 130 |
| uneven wear resistance | 105 | 105 | 105 | 115 | 100 | 95 |

| Tire | Ex. 10 | Ex. 11 | Ex. 12 | Ex. 13 | Ex. 14 |
|---|---|---|---|---|---|
| center peak height H1 (mm) | 0.6 | 0.8 | 0.8 | 0.8 | 0.8 |
| middle peak height H2a (mm) *1 | 0.4 | 0.6 | 0.6 | 0.6 | 0.6 |
| distance La/center land portion width Lc | 0.20 | 0.20 | 0.20 | 0.20 | 0.20 |
| distance Lb/middle land portion width Lm | 0.20 | 0.20 | 0.20 | 0.20 | 0.20 |
| middle peak height difference H2b − H2a (mm) | 0 | 0 | 0.05 | 0.3 | 0.15 |
| drainage | 125 | 130 | 135 | 135 | 140 |
| uneven wear resistance | 120 | 115 | 120 | 120 | 130 |

*1: the middle peak height of the inboard middle land portion

The invention claimed is:

1. A pneumatic tire comprising a tread portion, a pair of bead portions, and a pair of sidewall portions extending therebetween, in which tire the tread portion has an inboard tire tread edge and an outboard tire tread edge intended to be positioned towards the center of a vehicle body and away from the center of the vehicle body, respectively, and the tread portion is divided by circumferentially continuously extending main grooves into a center land portion, a pair of middle land portions, and a pair of shoulder land portions, and one of the sidewalls is configured to be positioned away from the center of the vehicle body and is provided with an indication denoting that it is an outside sidewall, wherein, in a meridian section of the normally-inflated unloaded tire, a center profile which is the profile of a tread of the center land portion and a middle profile which is the profile of a tread of each of the middle land portions protrude convexly, radially outwardly from a virtual tread profile, wherein the virtual tread profile is defined as smoothly passing through both axial ends of the tread of the center land portion and both axial ends of the tread of each of the middle land portions, a peak of the center profile which is the most protruding point farthest from the virtual tread profile is positioned on the outboard tire tread edge side of the axial center of the center land portion, a peak of the middle profile which is the most protruding point farthest from the virtual tread profile is positioned on the outboard tire tread edge side of the axial center of the middle land portion concerned, and a protruding height of the middle profile from the virtual tread profile is smaller in the inboard middle land portion than in the outboard middle land portion.

2. The pneumatic tire according to claim 1, wherein the axial distance La between the peak of the center profile and the axial center of the center land portion is 0.10 to 0.30 times the axial width of the center land portion, and the axial distance Lb between the peak of the middle profile and the axial center of the middle land portion is 0.10 to 0.30 times the axial width of the middle land portion.

3. The pneumatic tire according to claim 1, wherein the protruding height of the peak of the center profile from the virtual tread profile is more than the protruding height of the peak of the middle profile from the virtual tread profile, and each said protruding height is 0.1 to 1.5 mm.

4. The pneumatic tire according to claim 2, wherein the protruding height of the peak of the center profile from the virtual tread profile is more than the protruding height of the peak of the middle profile from the virtual tread profile, and each said protruding height is 0.1 to 1.5 mm.

* * * * *